(12) United States Patent
Trapp et al.

(10) Patent No.: US 6,511,768 B1
(45) Date of Patent: Jan. 28, 2003

(54) ELECTRODE SUBSTRATE FOR ELECTROCHEMICAL CELLS BASED ON LOW-COST MANUFACTURING PROCESSES

(75) Inventors: Victor Trapp, Augsburg (DE); Peter Wilde, Meitingen (DE); Heiko Leinfelder, Noerdlingen (DE)

(73) Assignee: SGL Carbon AG (DE)

( * ) Notice: Subject to any disclaimer, the term of this patent is extended or adjusted under 35 U.S.C. 154(b) by 62 days.

(21) Appl. No.: 09/787,035

(22) PCT Filed: Jun. 28, 2000

(86) PCT No.: PCT/IB00/00997

§ 371 (c)(1),
(2), (4) Date: Mar. 1, 2001

(87) PCT Pub. No.: WO01/04980

PCT Pub. Date: Jan. 18, 2001

Related U.S. Application Data

(60) Provisional application No. 60/142,702, filed on Jul. 7, 1999.

(51) Int. Cl.[7] ................................................. H01M 4/86
(52) U.S. Cl. .................. 429/44; 204/283; 204/284; 204/294; 502/101; 423/447.1; 423/447.2; 423/448
(58) Field of Search ................................. 204/283, 284, 204/294; 429/44; 502/101; 423/447.1, 447.2, 448

(56) References Cited

U.S. PATENT DOCUMENTS

| | | | |
|---|---|---|---|
| 3,914,960 A | 10/1975 | McGuffin et al. | 68/2 |
| 4,851,304 A | 7/1989 | Miwa et al. | 429/40 |
| 5,853,429 A | 12/1998 | Heine et al. | 8/115.54 |

FOREIGN PATENT DOCUMENTS

| | | | |
|---|---|---|---|
| EP | 0298690 | | 1/1989 |
| EP | 0791974 | | 8/1997 |
| GB | WO 98/27606 | * | 6/1998 |
| WO | 98/27606 | | 6/1998 |

OTHER PUBLICATIONS

Tajiri Hiroyuki, *Pat. Abs. of Japan* 017:No. 291, Abstract of JP 05 017260 (Osaka Gas Co Ltd), (Jan. 26, 1993).

* cited by examiner

*Primary Examiner*—Bruce F. Bell
(74) *Attorney, Agent, or Firm*—Connolly Bove Lodge & Hutz LLP

(57) ABSTRACT

This invention relates to electrode substrates for electrochemical cells, particularly low-temperature fuel cells, and processes for their production. Graphitized fiber web structures are used that have a preferred non-planar fiber alignment resulting in high through-plane conductivity. These structures are further impregnated and processed to adjust the final product properties.

42 Claims, 3 Drawing Sheets

ELECTRODE SUBSTRATE FOR ELECTROCHEMICAL CELLS BASED ON LOW-COST MANUFACTURING PROCESSES

This application claims the benefit of provisional application No. 60/142,702 filed Jul. 7, 1999.

FIELD OF THE INVENTION

This invention relates to electrode substrates for electrochemical cells, particularly polymer electrolyte membrane fuel cells (PEMFC) and Phosphoric Acid Fuel Cells (PAFC), and processes for their production.

BACKGROUND OF THE INVENTION

A fuel cell converts fuel, such as hydrogen, and an oxidant, typically oxygen, to electricity and reaction products. This electrochemical reaction is facilitated by electrocatalysts, typically from the platinum group.

Fuel cells typically are constituted of units, as shown in FIG. 1, called single cells 1, comprising an electrode assembly 1' where a membrane or electrolyte layer 2 is sandwiched between two electrodes 3 and 4, individually referred to as anode 3 and cathode 4. These electrodes are typically flat and have at least two parallel surfaces, the membrane or electrolyte layer 2 being positioned between these surfaces of the two electrodes.

Each of the electrodes 3 and 4 is composed of a porous conductive electrode substrate 3' and 4', usually made of carbon fiber paper or carbon cloth, and a thin electrocatalyst layer 3" and 4", preferably comprising finely divided platinum or other noble metal catalysts.

When using hydrogen as fuel, the fuel gas is oxidised at the anode 3 yielding protons and electrons. The former migrate through the membrane layer 2 from the anode to the cathode 4, while the electrons are transported through an external circuit to the cathode 4. At the cathode 4, oxygen is reduced by consumption of two electrons per atom, to form oxide anions which enter the electrolyte layer and react with the protons that have crossed the electrolyte layer to form water. As shown in this FIG. 1, separator plates 5 and 6 which are adjacent to the electrodes 3 and 4, may incorporate grooves 8 and 9 on the surfaces opposite to the electrodes providing access for the fuel and oxidant to the electrodes. The separator plates 5 and 6 can be covered with current collector plates 7 and 7' usually made of metal which also act as conductive connection between two adjacent single cells.

PEMFC generally employ a membrane electrode assembly (MEA, 1') as single cell comprising a thin polymer membrane 2 with high proton conductivity placed between two electrode sheets 3 and 4. PAFC single cells are typically constituted of a thin phosphoric acid containing matrix layer 2 sandwiched between the two electrodes 3 and 4.

The electrodes 3 and 4 mainly comprise of an electrically conductive and chemically inert electrode substrate (ES) 3' and 4' and an electrocatalyst layer (3" and 4") facing the membrane or electrolyte 2. The ES has a porous structure to provide an efficient entry passage and planar distribution for the fuel and oxidant to the catalyst layers 3" and 4" as well as an exit for the reaction products away from the catalyst layer. It also features other important properties such as high electrical conductivity, chemical stability, mechanical strength, and homogeneity.

As is shown in FIG. 1, it is advantageous to separate the functions of providing access and distributing fuel and oxidant (established by the grooves 8 and 9 in the separator or distributor plates 5 and 6 in FIG. 1) and the support of the catalyst layer 3" and 4" by the electrode substrates 3' and 4'. The separator or distributor plates 5 and 6 are usually made of metal or other conductive materials as they shall also serve to collect the current. They incorporate grooves 8 and 9 or other means of distribution of liquids or gases. These separator plates are stacked on the electrode substrates on the side opposite the electrolyte layer 2.

Current can be collected in the distributor or separator plates (as mentioned above), or in separate current collector plates which can be a solid metal sheet if they form the outer part of the assembly, or can be a mesh or porous conductive plate if they are stacked between the fuel feed and the electrodes (between 4 and 6, or between 3 and 5, in an assembly as otherwise shown in FIG. 1). It is also possible to combine the separator plates and current collector plates.

Since various gases and liquids have to permeate through the ES, high porosity is a preferable feature of an ES. At the same time, the pore size distribution needs to be adjusted to the general characteristics of practical fuel cells. The grooves in the electrode substrates provide a very coarse distribution of fuel and oxidant. These need to be evenly transported and finely distributed to the catalyst layer through the ES. Furthermore, various types of gases and liquids have to be transported through the ES which requires fine-tuning and adaptation of the ES porous network. Hence, adjusting the degree of porosity as well as pore size and its distribution of an ES is important for the performance of a fuel cell.

Equally important is the through-plane (perpendicular to the large surface) electrical conductivity of the ES since they provide a conductive path between the catalyst layer and the separator or current collector plates. A low electrical conductivity can result in substantial power losses of the fuel cell. Usually, high porosity of an ES has to be balanced against improved through-plane conductivity or vice versa.

Mechanical properties of ES play an increasingly important role for the production of commercial fuel cells since the ES are being handled by automatic equipment, and product integrity determines the commercial success of fuel cells.

In the light of fuel cell commercialisation efforts, ES are also required to be processable as a continuous roll material. This allows the application of industrial scale processes for the catalyst layer deposition and other required manufacturing steps.

Furthermore, a continuous roll ES provides high homogeneity and product uniformity in comparison with ES produced in a batch-mode.

Commonly used ES materials for fuel cells include carbon fibers (papers, felt, and woven cloth), metal fibers (mesh or gauze), and polymers (gauze filled with carbon materials).

A carbon fiber paper ES is usually made in such way that the carbon fibers are aligned mainly in planar direction. Due to the high anisotropy of carbon fibers, the in-plane conductivity of such carbon fiber paper is high but through-plane conductivity is poor. Such carbon fiber paper can be rendered suitable as ES for fuel cells if it is manufactured using a carbonisable binder followed by carbonising this product at high temperatures to achieve satisfactory through-plane conductivity (cf. U.S. Pat. No. 4,851,304). This type of ES is shown as a cross-section in FIG. 2. Carbon fibers 10 are aligned mainly in planar direction; carbonised binder particles 11 contribute to the mechanical stability of the ES. Carbonisable binder in this context means a binder, usually a binder resin which cross-links under the action of heat, that can be converted to elemental carbon in a high yield when heated for a prolonged time, i. e. more than 5 minutes up to several hours, above the decomposition temperature with the exclusion of oxygen or oxidising gases. This expensive batch-process yields ES with poor mechanical properties. WO 98/27606 relates to a process for filling carbon fiber papers and polymer substrates having low through-plane conductivity with conductive materials. The ES resulting from this procedure still lack a high through-plane conductivity and have a low porosity because the pores of the starting materials have to be filled with a high fraction of conductive material to achieve a sufficient level of through-plane conductivity.

Woven carbon cloth can be utilised as ES base material, but it is expensive and restricts the options to reduce the ES thickness. Metal fibers suitable for fuel cell ES are expensive since they need to be oxidation and corrosion resistant, and therefore must be selected from the noble metals such as platinum, iridium, rhodium, or osmium.

Consequently, what is required is a low-cost ES with high porosity as well as through-plane conductivity which is manufactured using an industrial scale continuous production process.

SUMMARY OF THE INVENTION

According to the present invention, electrode substrates for electrochemical cells, more specifically for fuel cells, with high porosity and good electrical conductivity and methods for their manufacture are disclosed. The electrode substrates comprise a carbonised or graphitised fiber (also often referred to as "graphite fiber") web structure with a high electric through-plane conductivity, said web structure being covered and filled with impregnation agent, and optionally, with chemically inert and conductive particles.

The ES described in this invention are made from conductive preformed web structures based on graphitised fibers that preferably have a through-plane conductivity of more than 1 S/cm, more preferably 6 S/cm or more, and especially preferred in excess of 6.4 S/cm. Through-plane conductivity is determined as described in WO 98/27606, which is herein incorporated by reference.

The ratio of through-plane conductivity to in-plane conductivity of the ES according to this invention is usually at least 0.25, preferably more than 0.42, and especially preferred more than 0.66. In-plane conductivity can be measured by a similar method, wherein two pairs of contact blocks are pressed on an ES material, and a current of 3 Ampere is applied between the two pairs of contact blocks. In-plane conductivity is then calculated from the voltage drop between the two pairs of blocks, the applied current, and the cross-section of the substrate and the distance between the two pairs of blocks.

The web is characterised by a high fraction of graphitised fibers being oriented not in planar direction. Graphitised fibers are highly anisotropic, thus their conductivity along the fiber axis is superior to the conductivity perpendicular to the fiber axis. Therefore, a high fraction of graphitised fibers with non-planar orientation in a web structure results in a high through-plane conductivity. Such web structures comprise, but are not limited to, woven cloth, needled felt, hydroentangled non-woven, and knitted fabric. High fraction in this context means at least 20 percent, preferably, at least 30%, and most preferred, more than 40% of all graphitised fibers. Such a web structure is shown in FIG. 3. The graphitised fibers 10 form a web which imparts the preferential orientation to the fibers.

The current method to manufacture such graphitised fiber based web structures is to use oxidised polyacrylonitrile (PAN) fibers followed by graphitisation in batch or continuous furnaces. The utilisation of carbon fibers for manufacturing such structures is prevented by the high stiffness of carbon fibers. Even forming such web structures from oxidised PAN fibers results in low manufacturing speed and relatively high scrap rates because these fibers are also difficult to process because of their mechanical properties.

A method to circumvent these problems is the highly efficient production of such web structures directly from PAN fibers, such as Dolanit® 12-based PAN fibers, which are then treated in a continuous oxidation furnace as described in U.S. Pat. Nos. 3,914,960 and 5,853,429, followed by a graphitisation step. This entire process is very cost effective and yields a uniform continuous material.

The web structures need to be processed further, in order to adjust their porous structure, bending stiffness, thickness and other desired final properties.

For this purpose, the web structure is impregnated th a liquid which may contain chemically inert and electrically conductive particles. Those impregnated conductive web structures are calendered to adjust the final thickness and the material homogeneity. During this step, the calendered material is heated and dried.

In another embodiment of this invention, the calendering step is followed by a final heat treatment. The conditions of this final heat treatment procedure are determined by the final ES properties. FIG. 4 is a cross-section of such an impregnated web structure according to this invention. The graphitised fibers 10 forming the web structure are mainly aligned perpendicular to the planar direction (the horizontal axis in this figure) and are enclosed by the impregnation agent 12 and optionally the chemically inert and electrically conductive particles. The pores 13 are still large and their size and shape are adjustable according to the requirements of the particular fuel cell electrode.

The process according to the invention yields a roll of low-cost ES with final properties superior to the prior art products. Such ES rolls can be used for subsequent fuel cell electrode manufacturing steps on industrial scale.

The foregoing and other features and advantages of the present invention will become more apparent from the following description.

All cross-sections (FIGS. 2 through 6) have the plane of the ES parallel to the horizontal axis.

DETAILED DESCRIPTION

In one embodiment of the web structure, a hydroentangled non-woven made from oxidised PAN fibers, such as ®PANOX fibers from SGL CARBON, is employed.

In another embodiment of this invention, the web structure is formed by a felt needling process employing oxidised PAN fibers.

In a further embodiment of the web structure, a woven cloth based on oxidised PAN fibers is used.

In one embodiment of the ES production process, web structures made from PAN fibers are treated in a continuous oxidation furnace as described in U.S. Pat. Nos. 3,914,960 and 5,853,429. This process can be referred to as "Direct Oxidation Process" (DOP).

The PAN based web structures are heat treated in an oxidising air atmosphere at 200 to 350° C. under tension. Tension is required to achieve better mechanical properties of the oxidised product as well as to prevent high shrinkage of the material during the DOP.

In the next step according to this invention, either web structure made from oxidised PAN fibers or web structures resulting from DOP are graphitised to achieve a high through-plane conductivity. The graphitisation furnace can be a batch furnace, but preferably a continuous-processing furnace with a graphite muffle is employed. Under inert gas atmosphere, the web structure is treated at temperatures between 1500 to 2500° C., most preferably between 1650 to 2000° C.

Figure 3:
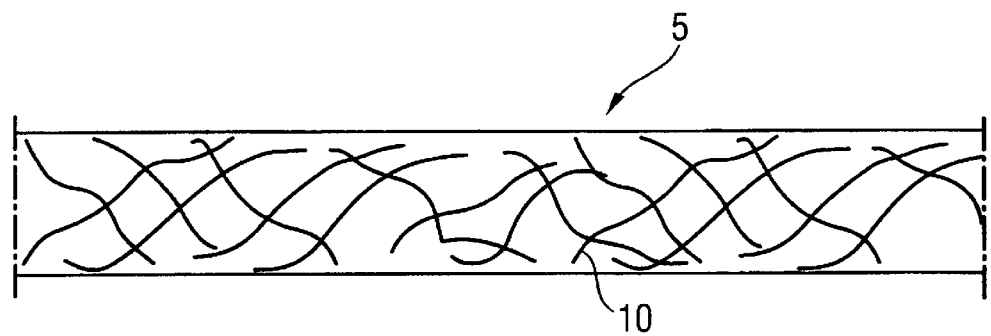
FIG. 3 is a side view (cross-section) of a conductive graphitised fiber web structure according to this invention.

Such graphitised web structures as shown in FIG. 3 are characterised by high through-plane conductivity of more than 1 S/cm, preferably between 6 and 10 S/cm and porosity ranging from 80% to 95%, preferably 85 to 90%. The mean pore sizes (diameter) of such web structures can be found in the range from 75 $\mu$m to 500 $\mu$m. Porosity is defined here as the ratio of pore volume to total volume, measured in percent.

The graphitised web structures are subsequently impregnated with an impregnation agent or a mixture of an impregnation agent with chemically inert and electrically conductive particles.

In one embodiment of this invention, the impregnation agent is a liquid solution or dispersion of a thermoplastic resin which comprises, but is not limited to, polyethylene, polypropylene, amorphous thermoplastic copolymers made from ethylene, propylene or mixtures thereof with cyclic or polycyclic olefins such as norbornene and ethylidene norbornene, polyphenylene sulphide, polystyrene, ABS (thermoplastic acrylonitrile butadiene styrene terpolymers), styrene maleic anhydride copolymers, and partially fluorinated resins such as PVDF, ethylene tetrafluoroethylene copolymers, and the like. In another embodiment this impregnation agent can be a thermoset resin like phenolic resins, furane resins, or epoxy resins. Most preferred are such resins that have a high mass fraction of aromatic moieties, such as phenolic resins. A high mass fraction in this context means at least 30 percent, preferably 40 percent, and most preferred at least 50 percent of aromatic moieties. Solutions of such thermoset resins, or solutions of non-cross-linked precursors of such thermoset resins may also be employed.

In a further embodiment the impregnation agent can be a carbonisable material such as, but not limited to, coal tar pitch, petroleum pitch, tall pitch or wood pitch, or a solution thereof in an appropriate solvent.

Optionally, chemically inert and conductive particles can be added to the impregnation agent for adjusting the viscosity of the impregnation mixture and for adjusting certain properties of the final ES such as the microporous structure, in-plane conductivity, contact resistance, and mechanical strength. Among the particles that can be added to the impregnation agent, mention is made of graphitic materials, such as graphitised fibers, graphite nanofibers, graphite flakes, graphite powders, metal carbide materials such as metal carbide powders, metal carbide fibers, and metal carbide nanofibers, which lists are not exhaustive, and serve for illustration only.

In accordance with the present invention, the amount of impregnation agent, additional particles, and impregnation mixture applied to the web structure depends on the nature of the used agents and particles, on the impregnated web structure as well as on the desired properties of the final ES. Generally, the ratio of the mass of the impregnation agent or impregnation mixture to the mass of the web structure may be from 5:100 to 400:100, preferably from 10:100 to 300:100, most preferred from 25:100 to 250:100.

The impregnation agent or the impregnation mixture can be applied by various techniques. Such techniques include, but are not limited to, transfer coating, roller coating, dipping, doctor-blade techniques, and spraying.

Figure 5:
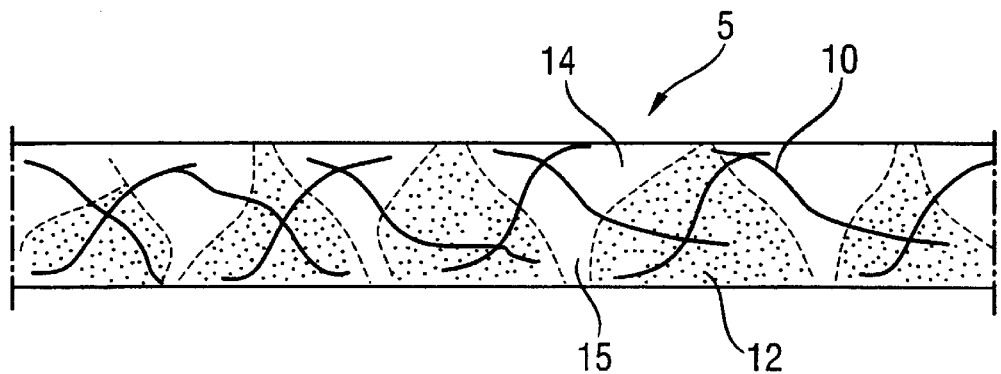
FIG. 5 is a side view (cross-section) of an ES with a pore size gradient according to this invention.

In one embodiment of this process, the impregnation agent or impregnation mixture is applied single-sided only resulting in a porous structure with a gradient. Such a structure is shown as a cross-section in FIG. 5. Single-sided in this context means that the impregnating agent is applied to the web structure on one side only (the bottom side in the structure as depicted in FIG. 5), usually resulting in a non-homogeneous saturation of the web with the impregnating agent, with the region opposite to the side where the impregnating agent had been administered has a lower content of impregnating agent, and therefore, a higher fraction of open or unfilled pores. Such a gradient pore structure facilitates a better reactant distribution to the catalyst layer. It has been found that the pores of such single-side impregnated structures have a cone-like shape. This is illustrated in FIG. 5, where a web of graphitised fibers 10 has been impregnated, the impregnating agent having been administered from the bottom side of the web only. The impregnating agent 12 (or its carbonised residues) is concentrated in the lower part of the cross-section, leading to formation of small pores 15 in the bottom region of the ES, while larger pores 14 are formed in the upper regions of the ES, where less impregnation agent has penetrated.

Figure 6:
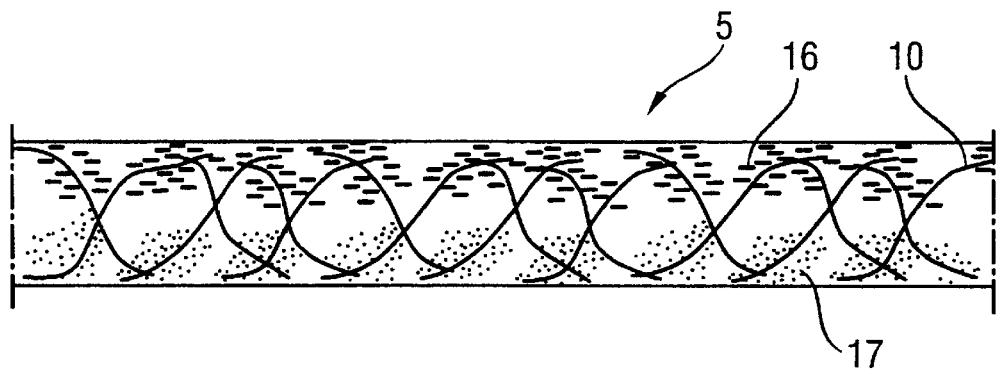
FIG. 6 is a side view (cross-section) of an ES with a property gradient perpendicular to the planar direction according to this invention.

Another embodiment of this process comprises a simultaneous double-sided impregnation process by using different impregnation agents or impregnation mixtures for the opposite (top and bottom) faces of the web structure. This procedure can be required for imparting different properties into the top and bottom faces of the ES such as, but not limited to, surface roughness, pore size, microporosity, water contact angle, and capilarity. The result of such impregnation method is shown in FIG. 6, where the web of graphitised fibers 10 has regions where only impregnation agent I (administered from the top face) has penetrated and formed a porous layer 16, whereas impregnation agent II which had been administered from the bottom face has only penetrated the lower region and formed another porous layer 17. As in FIG. 5, the individual pores formed have a conical structure, the narrow region being adjacent to the side from where the impregnation agent has been applied.

In a further embodiment of the impregnation process, the top and bottom face of the web structure may be impregnated by two subsequent steps.

If such an ES is cut perpendicularly to the planes, a property gradient perpendicular to the planar direction can be detected which results from using different impregnation agents or impregnation mixtures for the top and bottom side of the ES. This fact is illustrated in FIG. 6 (see above). The gradient is governed by the diffusion velocity of the impregnating agents within the porous web structure. If the impregnating agents also comprise particulate fillers, a filtration effect may be added if the pore size is not considerably larger than (more than twice the size of) the filler particles.

Following the impregnation, the web structure is submitted to a calendering step. The compression force is adjusted to the amount and nature of impregnation agent, additional particles, and impregnation mixture and also depends on the impregnated web structure as well as on the desired properties of the final ES. In general, during the calendering step the impregnated web structure is subjected to a compression force resulting in a thickness reduction between 2 to 15%, preferably 5 to 10%.

During the calendering step, the web structure is submitted to elevated temperatures. If the applied temperatures range between 30 and 250° C., the web structure is usually heated within the calender itself. If temperatures up to 500° C. are required, additional heaters are utilised. Such heaters may be, but are not limited to, IR-heaters, electrical resistance heaters, and hot gas blowers. The temperatures applied during the calendering step are preferably selected to dry the impregnated material, melt or cure the impregnation agent and to keep the calendered material at the desired final thickness.

Another embodiment of this invention comprises a final heat treatment step. This step may be required for achieved certain ES properties. Such a final heat treatment step can be applied when the impregnation agent is a carbonisable material, such as a thermoset resin or pitch. This final heat treatment is carried out in a continuous-processing furnace with a ceramic muffle under nitrogen atmosphere approximately at from 500 to 1200° C.

All ES manufacturing processes described in this invention can be carried out in an industrial scale thus providing a low-cost product. Furthermore, ES manufactured by the methods described here have a sufficiently low bending stiffness allowing winding and take-up on reels, and further processing as roll-material without compromising mechanical properties required for such industrial scale processing steps.

While particular materials, processes and embodiments of this invention have been described, this description is not meant to be construed in a limiting sense. It is understood that various modifications of the preferred embodiments, as well as additional embodiments of the invention, will be apparent to those skilled in the art upon reference of this description without departing from the spirit and scope of the invention, as defined in the following claims. It is therefore contemplated by the appended claims to cover any such modifications or embodiments that fall within the true spirit and scope of the invention.

LIST OF FIGURES

Figure 1:
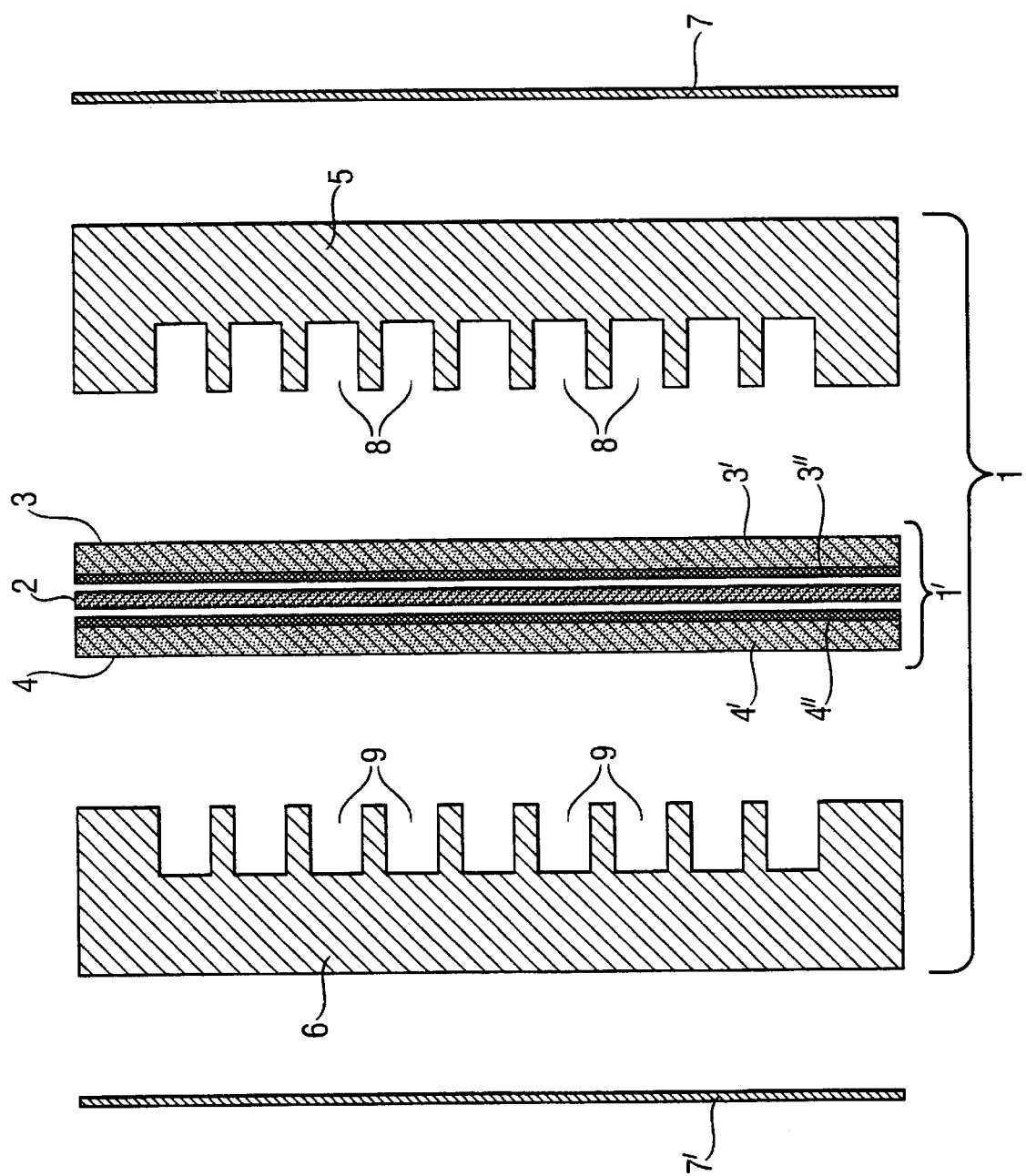
FIG. 1 is an exploded side view of a single cell showing the structure of a phosphoric acid, or a membrane, fuel cell, viz., a flat plate electrode fuel cell where the electrode substrate of the present invention can be applied.
Figure 2:
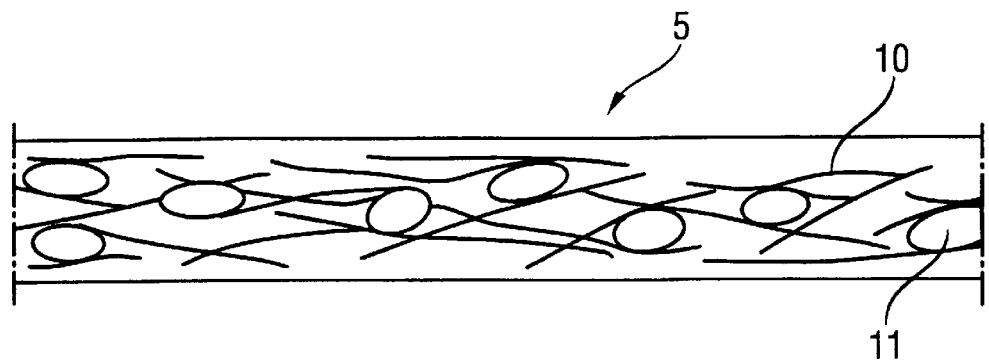
FIG. 2 is a prior art side view (cross-section) of a carbon fiber ES, where the carbon fibers are mainly aligned in planar direction.
Figure 4:
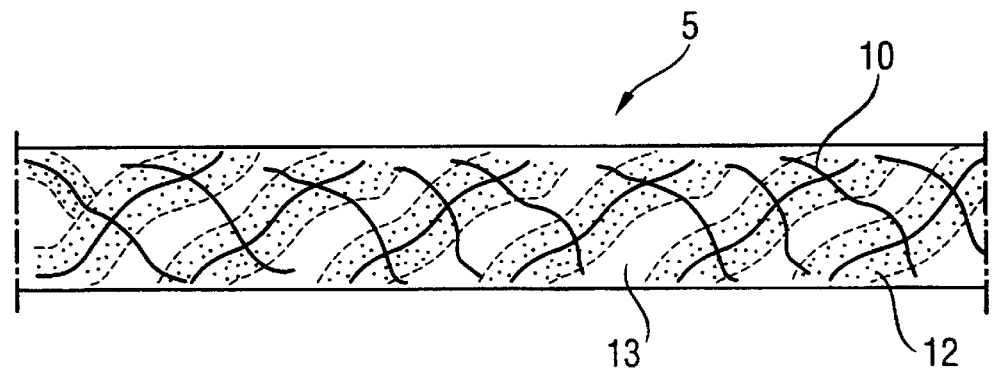
FIG. 4 is a side view (cross-section) of an ES according to this invention.

FIG. 1 exploded side view of a phosphoric acid or membrane fuel cell
FIG. 2 side view (cross-section) of a carbon fiber ES
FIG. 3 side view (cross-section) of a conductive graphitised fiber web structure
FIG. 4 side view (cross-section) of an impregnated graphitised fiber web structure
FIG. 5 side view (cross-section) of an impregnated graphitised fiber web structure with a pore size gradient
FIG. 6 side view (cross-section) of an impregnated graphitised fiber web structure with a property gradient

LIST OF REFERENCE NUMERALS IN THE FIGURES

1 Fuel Cell Assembly
1' Electrode Assembly
2 Electrolyte Layer or Membrane
3 Anode
3' Anode Support Structure
3" Anode Catalyst Layer
4 Cathode
4' Cathode Support Structure
4" Cathode Catalyst Layer
5,6 Separation or Distribution Plate
7,7' Current Collector Plates
8,9 Grooves
10 Graphitised Fibers
11 Binder
12 Impregnation Agent
13 Pore
14 Large Pore
15 Small Pore

What is claimed is:

1. An electrode substrate for an electrochemical cell, said substrate comprising a graphitized fiber web structure with high electrical through-plane conductivity of more than 1 S/cm, said web having pore sizes between from 75 $\mu$m to 500 $\mu$m, and said web structure being covered and filled with impregnation agent and optionally with chemically inert and conductive particles.

2. The electrode substrate according to claim 1, wherein said web structures are characterised by a fraction of at least 20% of graphitised fibers being oriented not in planar direction.

3. The electrode substrate of claim 1, wherein the ratio of the through-plane conductivity to the in-plane conductivity is at least 0.25.

4. The electrode substrate according to claim 1, said web having a porosity ranging from 80% to 95%.

5. The electrode substrate according to claim 1, wherein said web structure is a woven cloth.

6. The electrode substrate according to claim 1, wherein said web structure is selected from the group consisting of a needled felt, a hydroentangled non-woven, a woven cloth, and a knitted fabric.

7. The electrode substrate according to claim 1, wherein said impregnation agent comprises a solution or dispersion of resins selected from the group consisting of thermoplastic resins, partially fluorinated resins, phenolic resins, furane resins, and epoxy resins.

8. The electrode substrate according to claim 1, wherein said impregnation agent comprises pitch.

9. The electrode substrate according to claim 1, wherein said with chemically inert and conductive particles comprise graphitic materials.

10. The electrode substrate according to claim 1, wherein said with chemically inert and conductive particles comprise metal carbide materials.

11. A process for producing an electrode substrate according to claim 1, said process comprising graphitization of a fiber web structure based on oxidized polyacrylonitrile fibers under inert gas atmosphere at temperatures between 1500 to 2500° C.

12. A process for producing an electrode substrate according to claim 1, said process comprising treating a web structure made from oxidized polyacrylonitrile fibers in an oxidizing air atmosphere at 200 to 350° C. under tension followed by graphitization under inert gas atmosphere between 1500 to 2500° C.

13. A process for producing an electrode substrate according to claim 1, said process comprising impregnation and calendering of a graphitised fiber web structure.

14. The process of claim 13 wherein the ratio of the mass of the impregnation agent or impregnation mixture to the mass of the web structure is from 5:100 to 400:100.

15. The process of claim 13 wherein the impregnation agent or impregnation mixture is applied single-sided resulting in a porous structure with a gradient.

16. The process of claim 13 wherein a simultaneous double-sided impregnation process is applied by using different impregnation agents or impregnation mixtures for the top and bottom face of the web structure.

17. The process of claim 13 wherein the top and bottom face of the web structure are impregnated by two subsequent steps.

18. The process of claim 13 wherein the calendering step results in a thickness reduction of the impregnated web structure of between 2 and 15%.

19. The process of claim 13 wherein the impregnated web structure is submitted to elevated temperatures during the calendering step.

20. The process of claim 13 wherein the impregnated web structure is heated by the calender itself in the temperature range between 30 to 250° C.

21. The process of claim 13 wherein the impregnated web structure is heated by external heaters, and temperatures from 250 to 500° C. are applied.

22. A process for producing an electrode substrate according to claim 1, said process comprising impregnation and calendering of a graphitised fiber web structure and an additional final heat treatment step.

23. The process of claim 22 wherein the final heat treatment step is carried out in a continuous-processing furnace with a ceramic muffle under nitrogen atmosphere at 500 to 1200° C.

24. An electrode substrate for an electrochemical cell, said substrate comprising a graphitized fiber web structure with high electrical through-plane conductivity of more than 1 S/cm, said web structure being covered and filled with impregnation agent and optionally with chemically inert and conductive particles, and wherein said web structure is selected from the group consisting of a needled felt, a hydroentangled non-woven, and a knitted fabric.

25. The electrode substrate according to claim 24, wherein said impregnation agent comprises a solution or dispersion of resins selected from the group consisting of thermoplastic resins, partially fluorinated resins, phenolic resins, furane resins, and epoxy resins.

26. The electrode substrate of claim 24, wherein said web structures include a fraction of at least 20% of graphitized fibers being oriented not in planar direction.

27. The electrode substrate of claim 24, wherein said impregnation agent comprise pitch.

28. The electrode substrate of claim 24, wherein said chemically inert and conductive particles comprise graphitic materials.

29. The electrode substrate of claim 24, wherein said chemically inert and conductive particles comprise metal carbide materials.

30. A process for producing an electrode substrate according to claim 24, said process comprising graphitization of a fiber web structure based on oxidized polyacrylonitrile fibers under inert gas atmosphere at temperatures between 1500 to 2500° C.

31. A process for producing an electrode substrate according to claim 24, said process comprising treating a web structure made from polyacrylonitrile fibers in an oxidizing air atmosphere at 200 to 350° C. under tension followed by graphitization under inert gas atmosphere between 1500 to 2500° C.

32. A process for producing an electrode substrate according to claim 24, said process comprising impregnation and calendering of a graphitized fiber web structure.

33. The process of claim 32 wherein the ratio of the mass of the impregnation agent or impregnation mixture to the mass of the web structure is from 5:100 to 400:100.

34. The process of claim 32 wherein the impregnation agent or impregnation mixture is applied single-sided resulting in a porous structure with a gradient.

35. The process of claim 32 wherein a simultaneous double-sided impregnation process is applied by using different impregnation agents or impregnation mixtures for top and bottom faces of the web structure.

36. The process of claim 32 wherein the top and bottom faces of the web structure are impregnated by two subsequent steps.

37. The process of claim 32 wherein the calendering step results in a thickness reduction of the impregnated web structure of between 2 and 15%.

38. The process of claim 32 wherein the impregnated web structure is submitted to elevated temperatures during the calendering step.

39. The process of claim 32 wherein the impregnated web structure is heated by the calender itself in the temperature range between 30 to 250° C.

40. The process of claim 32 wherein the impregnated web structure is heated by external heaters, and temperatures from 250 to 500° C. are applied.

41. A process for producing an electrode substrate according to claim 7 which comprises impregnation and calendering of a graphitized fiber web structure and an additional final heat treatment step.

42. The process of claim 41 wherein the final heat treatment step is carried out in a continuous-processing furnace with a ceramic muffle under nitrogen atmosphere at 500 to 1200° C.

\* \* \* \* \*